United States Patent [19]

Seckel et al.

[11] 3,879,750

[45] Apr. 22, 1975

[54] TONE CORRECTION APPARATUS FOR COLOR ANALYZERS

[75] Inventors: Thomas G. Seckel, Rochester; Edward M. Waz, Hilton, both of N.Y.

[73] Assignee: Eastman Kodak Company, Rochester, N.Y.

[22] Filed: Jan. 18, 1974

[21] Appl. No.: 434,720

[52] U.S. Cl. .......................... 358/76; 358/27; 358/80

[51] Int. Cl. .......................... H04n 9/02

[58] Field of Search .......................... 358/27, 32, 76, 80

[56] References Cited

UNITED STATES PATENTS

| | | | |
|---|---|---|---|
| 3,459,885 | 8/1969 | Goldmark et al. | 358/27 X |
| 3,644,664 | 2/1972 | Huboi et al. | 358/27 X |
| 3,737,561 | 6/1973 | Boer | 358/27 |

*Primary Examiner*—Richard Murray
*Attorney, Agent, or Firm*—G. E. Grosser

[57] ABSTRACT

A signal correction apparatus is provided for use in color analyzers of the type having a scanner for photographic originals which produces image information in the form of an ordered train of tone value signals for the primary colors. The correction apparatus is so synchronized with the operation of such a scanner that the tone value signals may be modified according to functional relationships which are individualized by color. Using such correction apparatus, visual representations of a photographic copy image may be produced which are based on the tone response characteristics for each of the three primary colors rather than a single, compromise response characteristic.

11 Claims, 7 Drawing Figures

TONE CORRECTION APPARATUS FOR COLOR ANALYZERS

BACKGROUND OF THE INVENTION

Field of the Invention

The present invention relates to color analyzers (often referred to as "color viewers") for simulating, on a cathode ray tube or other image display apparatus, the copy image which would result with various processing parameter selections in the photographic copying of a photographic original. More particularly, the invention provides apparatus which makes possible the accurate simulation by such anaylzers of photographic copying systems which exhibit disparate tone response characteristics.

The invention, and the prior art, will be described with reference to the drawings, wherein.

Figure 5B:
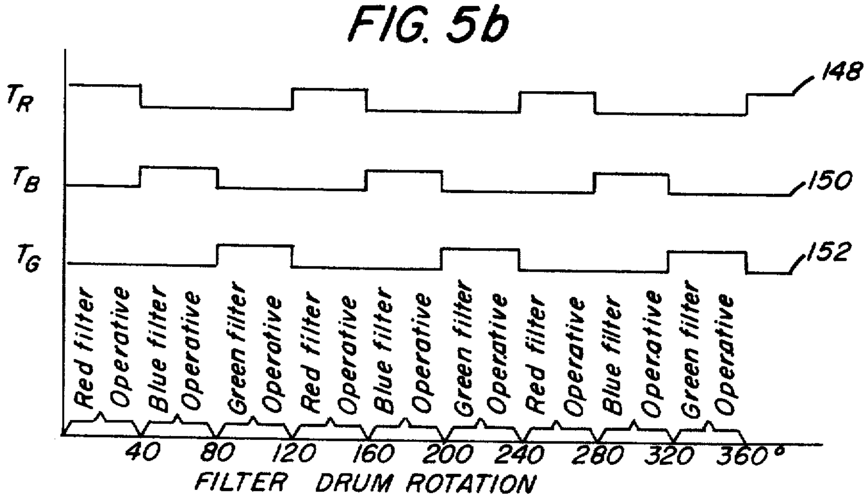
Figure 5A:
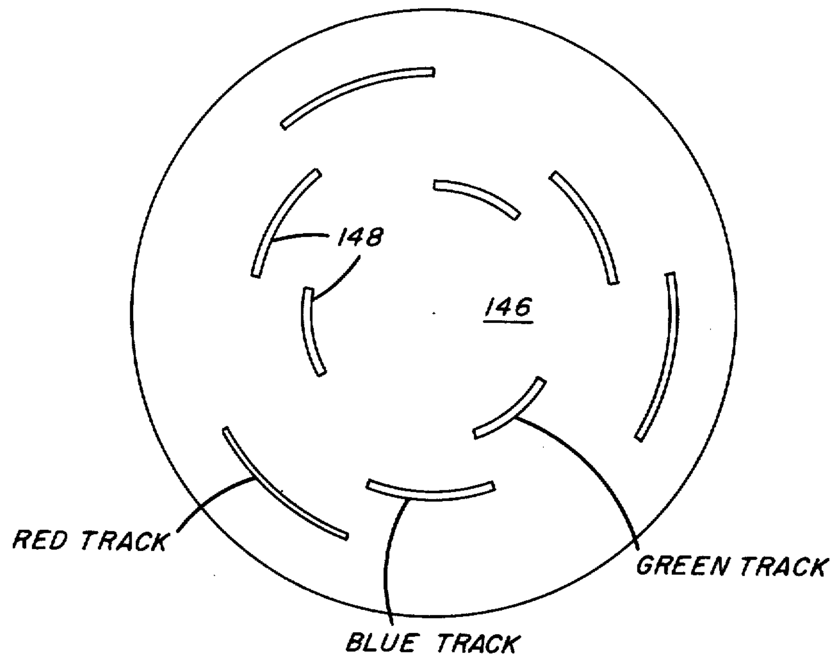
Figure 6:
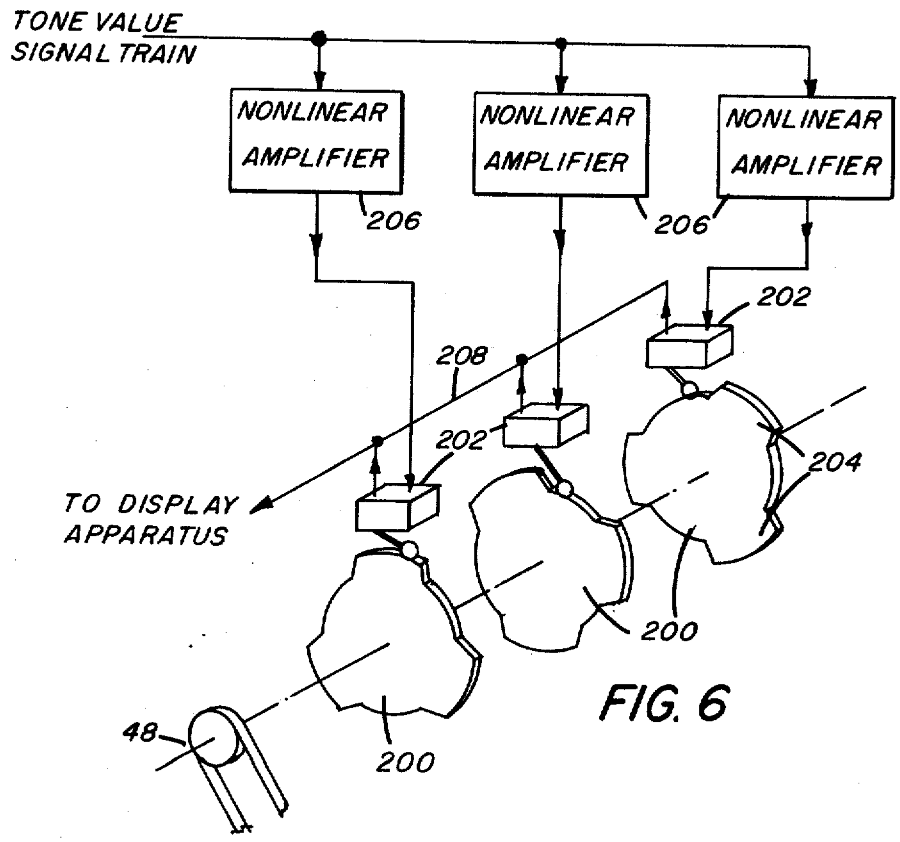

FIG. 5*a* is a simplified front view of a preferred type of timing disk;

FIG. 5*b* indicates a series of pulse diagrams useful in describing the operation of the timing disk of FIG. 5*a*; and FIG. 6 is a schematic representation of an alternative embodiment according to the invention.

Description Relative to the Prior Art

In order to fully understand the present invention, it is first necessary to become somewhat familiar with prior art apparatus for providing visual representations simulating, photographically produced, copy images. As an aid to the description which follows, reference will be made to FIG. 1 of the drawings. Attention is also directed to U.S. Pat. No. 3,351,707 to Dreyfoos et al. which discloses an analyzer that is essentially the same as the apparatus to be outlined in discussing the prior art.

Color analyzers serve in providing a displayed image which is a representation of the copy image which would be produced through photographic copying of a photographic original. An analyzer operator inserts therein an image bearing original and makes parameter selections which correspond to the filter and brightness selections which are available in the production of a photographic copy. Then the analyzer, based upon the original image and the set of parameter selections, simulates the response of the photographic copying system (this term herein being taken to include the processor, the sensitized materials employed and any other copy image influencing factors) and produces a display image which represents the photographic copy image which would be produced employing the simulated copying system with the corresponding set of selections.

Figure 1:
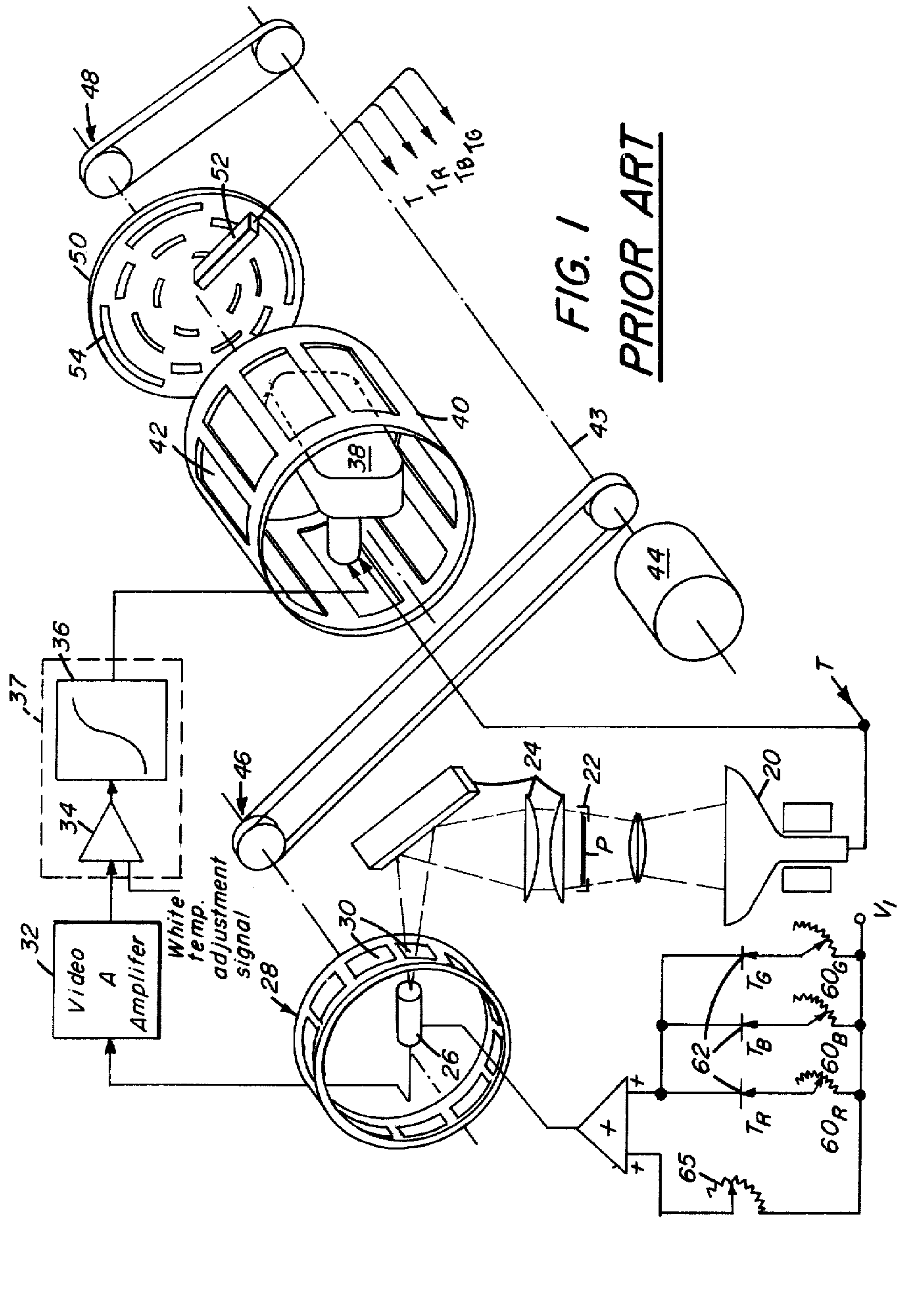
FIG. 1 PRIOR ART
FIG. 1 is a simplified schematic representation in perspective of a typical prior art analyzer.

Now referring to FIG. 1, the basic functioning of a typical color analyzer will be briefly described. For convenience of description, a color analyzer can be considered as a cooperating arrangement of basic functional components or instrumentalities including a scanning apparatus, a signal processing apparatus, a display apparatus, a synchronizing apparatus and a parameter selection apparatus.

The scanning apparatus serves to derive image information from a photographic original received therein and typically comprises: a flying spot type scanning device 20, for producing a scanning beam of light; a holder 22, for supporting a received photographic original (denoted P) in the path of the scanning beam; an optical apparatus 24, for controlling and directing the scanning beam; and a photomultiplier tube 26, which receives the scanning beam after modulation by the photographic original and produces an output signal in accordance therewith. Also included is a rotatable filter drum 28 which is arranged for, upon rotation, repeatedly introducing an ordered series of primary color filters 30 (additive or subtractive) in the path of the scanning beam.

Rotation of the filter drum 28 is synchronized with the scanning device 20, as will be discussed more fully hereinafter, and each of the filters 30 is, in sequence according to position on the filter drum, arranged in the path of the scanning beam for an entire image scanning operation. With each rotation of the filter drum 28, the filter sequence is repeated. Hence, the output of the photomultiplier tube 26 takes the form of a train of signals; each signal representing tone values along the path of an entire image scan (usually two interleaved traverses) for a respective primary color. The color-order for these signals (hereinafter referred to as tone value signals), it will be appreciated, is the order established in arranging the primary color filters 30 on the filter drum 28.

The train of tone value signals from photomultiplier tube 26 is transmitted for signal processing to apparatus which typically includes a video amplifier 32, for increasing signal level, a white temperature adjustment circuit 34, and a tone correction apparatus 36, all of which are connected in series. The white temperature adjustment circuit 34 typically acts as a signal summer and adds to the tone value signals a component (denoted white temperature adjustment signal in FIG. 1) which is established to maintain the white temperature of the image produced by the display apparatus at a desired level.

Of specific interest regarding the instant invention is the tone correction (frequently referred to as gamma correction) apparatus 36 which applies a nonlinear correction to the tone value signals. Circuitry specifically designed for such application is disclosed in U.S. Pat. No. 3,441,663 to Dreyfoos et al. The correction applied by such circuitry modifies the tone value signals both to reflect the response characteristics of the photographic system selected for analysis, and to compensate for the response characteristics of the display apparatus. In the prior art, a single nonlinear amplifier circuit is employed to modify, according to a common preestablished functional relationship, all of the serially transmitted tone value signals. Since a single functional relationship is applied in common as a basis for correcting the signals of the signal train, differences in response characteristics for the individual primary colors cannot be taken into consideration in the simulation. Thus, while eliminating any need to identify the color correspondence of the individual tone value signals this approach, in effect, assumes a copying system wherein the tone response for all three primary colors can be treated as being uniform.

After the gamma correction has been applied, the tone value signals are transmitted to a display apparatus which typically includes a cathode ray, image display tube 38 and a rotatable filter drum 49. The image display tube 38 produces a visual image according to the tone value signals; and the filter drum 40, upon rotation, repeatedly arranges a series of primary color filters 42 (additive or subtractive according to the nature of the filters 30 of the filter drum 28) in front of the displayed image (see FIG. 1). The filters 42 of filter drum 40 are arranged in a color-order corresponding to the filters 30 of filter drum 28 and are arranged in synchronism therewith. Thus when, for example, a red filter on drum 28 is introduced in the scanning beam, a red filter on drum 40 is rotated in front of the display tube 38.

The various instrumentalities of a color analyzer are caused to operate in proper time relationship by the aforementioned synchronizing apparatus, a baisc component of which is a timing shaft 43 driven by a motor 44. The filter drums 28 and 40 are connected to rotate in common relation to the time shaft 43 by means of shaft-timing belt combinations 46 and 48 respectively to thereby cause the filters on the two drums to be operatively arranged in synchronism, with respect to their corresponding filters. This drive arrangement provides considerable flexibility for filter-positioning; however, it will be appreciated that numerous alternatives for driving filter drums 28 and 40 are possible including direct mounting to the timing shaft 43.

The various electrical instrumentalities of the analyzer are caused to operate in proper time relation to each other and to rotation of the filter drums by means of a series of electrical timing signals. These signals are produced by a timing disk 50 operating in conjunction with an associated sensing apparatus 52. The timing disk 50 is mounted for rotation corresponding to rotation of the filter drums and, for example, may be mounted to the shaft which drives filter drum 40 as illustrated in FIG. 1. For one possible type of timing disk, a series of light passages or perforations 54 are formed along concentric, fixed radius tracks to extend over arcs corresponding to the occurrence of significant events in the rotational cycle of the analyzer. Perforations 54 are employed, inter alia, to indicate angular positions in the rotational cycle at which individual line scans are performed (denoted a T signal in FIG. 1) and the angles of rotation over which the various color filters are operatively arranged (denoted $T_R$, $T_B$ and $T_G$ signals in FIG. 1 corresponding to red, blue and green respectively). The timing signals which are based upon the presence or absence of perforations 54 in the individual tracks as determined at a detection site are produced by the sensing apparatus 52 which typically includes a series of light source-photocell pairs arranged in opposed relationship on opposite sides of the timing disk 50. The individual light source-photocell pairs are located at positions corresponding with the tracks on timing disk 50. Since the timing disk 50 rotates in a fixed relation to rotation of the filter drum 40, and hence also the correspondingly rotated filter drum 28, a constant phase relationship is maintained between the electrical timing signals and these repeating mechanical movements within the analyzer. The electrical timing signals are employed in controlling such operations as scanning and display, and are so timed as to coordinate those operations with the interposition of the primary color filters as was indicated hereinabove.

For a more detailed description of synchronizing apparatus of the above discussed type, attention is direction to U.S. Pat. No. 3,351,707 to Dreyfoos et al.

The parameter selection apparatus provides for operator selectable adjustments on the analyzer corresponding to parameter selections which might be made during actual photographic copying. This apparatus produces a signal for application to a control grid of the photomultiplier tube 26 to adjust the gain thereof in accordance with selections which are made. For purposes of this discussion, the parameter selection apparatus may be considered in a simplified form as including a set of three potentiometers 60, each corresponding to a primary color (denoted by a designation R, B, or G in FIG. 1) and connected from a voltage source $V_1$ through a set of signal controlled gates 62 to a summer 64. The gates 62 are controlled by timing signals $T_R$, $T_B$ and $T_G$ which indicate the color represented by the instant tone value signal. A potentiometer 65 is also provided which is connected between the voltage source $V_1$ and the summer 64 to serve as an overall brightness adjustment and this is not gated respective of primary color. The output signal of the summer 64 is transmitted to a control grid of the photomultiplier tube 26 for influencing tube gain.

In operation, an operator selects settings for the potentiometers 60R, 60B, 60G and 66 which correspond to the filter and exposure selections for photographic processing. The scanning apparatus then produces tone value signals at photomultiplier tube 22 which uniformly relate to the setting of the potentiometer 66 and which individually, according to primary color, relate to the setting of either the potentiometer 60R, 60B or 60G.

The tone value signals are sent from photomultiplier tube 26 to signal processing apparatus for amplification and tone correction and are then transmitted to the display apparatus 38, 40 where the simulated copy image is produced.

Figure 2:
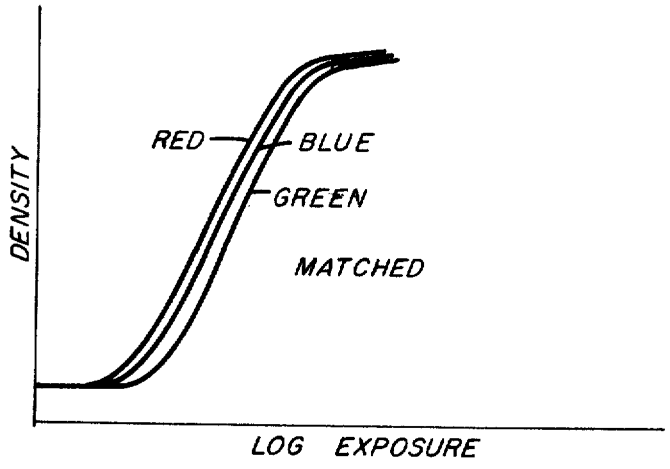
FIG. 2 is a graphical representation of a set of matched tone response curves.
Figure 3:
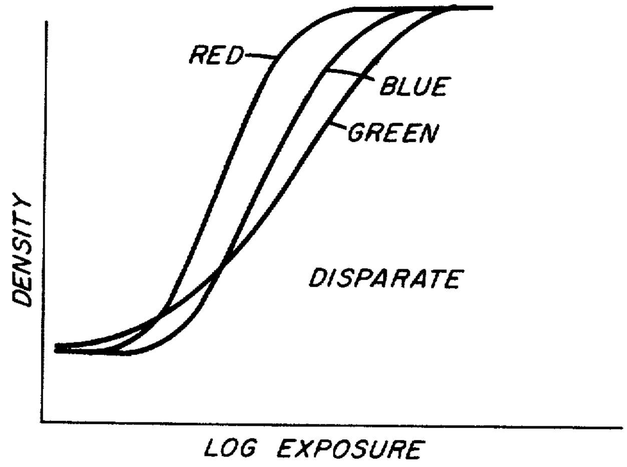
FIG. 3 is a graphical representation of a set of disparate tone response curves.

One shortcoming of the above-described analyzer results from the manner in which the nonlinear tone response correction is applied to the tone value signals. The use of a common nonlinear amplifier for all three of the primary color signals in effect assumes response characteristics for the primary colors which are "matched," i.e. of similar shape (see FIG. 2). For materials having matched tone reproduction curves, a single commonly-applied correction relationship can within practical accuracy reflect the tone response for all of the primary colors. This is not the case, however, when the tone response is disparate for the three primary colors as illustrated in FIG. 3. No one relationship will suffice to provide an accurate simulation for this condition which is not uncommon when various combinations of photographic materials are utilized which have not been developed for use together. Often such "unmatched" combinations cannot be avoided, for example, when duplicating movie film where intercutting of several different photographic materials has occurred in producing the original. When these disparate response situations are encountered dramatic variations in the copy image can occur as exposure is varied and the problem of seeking out a set of copying parameters to provide a pleasing copy is compounded. Thus, although accurate simulation would be particularly helpful in these situations, prior art simulation techniques tend to assume away response characteristics which are often critical to the copy results obtained.

SUMMARY OF THE INVENTION

The instant invention is premised upon the idea of intercepting the train of sequentially ordered tone value signals for the primary colors, produced by the scanning apparatus of an analyzer of the above-described type, and so synchronizing corrective modification of those signals that individualized tone correction for the primary colors may be provided. Thus the invention takes recognition of the fact that, even though such an ordered train of tone value signals may be modified for tone correction by commonly applied, nonlinear amplification, such tone correction does not permit an accurate simulation for various film systems having disparate tone reproduction qualities for the primary colors. Thus in one embodiment of the invention individualized tone correction according to primary color is provided for by (1) producing color timing signals indicating the color represented by the individual tone value signals and (2) selectively changing the amplification characteristics of an amplifier circuit operating on the tone value signals responsive to the color timing signals. Specifically in a presently preferred implementation of the invention, sensors cooperating with a timing disk generate logic signals timed to indicate, for the individual primary colors, the occurrence of representative tone value signals in the signal train and these logic signals control gate circuits which operate to change the gain characteristic of a nonlinear amplifier according to color. It should be appreciated that numerous alternatives are within the contemplation of the invention as, for example, commutating the tone value signals using switching or gates to separate nonlinear circuits for individualized modification thereby and then recombining the signals in a serial train at a junction for transmission to the display apparatus.

Objects of the Invention

To provide a tone correction apparatus, for use in a color analyzer, which will correct the tone value signals produced therein according to relationships that are individualized by color and further to provide such an apparatus which requires no change to the basic operation of the analyzer but rather so operates upon the tone value signals that, after individualized correction, the corrected signals can be transmitted to a display apparatus in the pre-existing, serial, color-ordered arrangement.

The invention and its objects and advantages will become more apparent in the detailed description of the preferred embodiment presented below.

DESCRIPTION OF THE INVENTION

Now referring to FIG. 4 a preferred correction apparatus in accordance with the present invention will be described. This preferred apparatus is intended for use in color analyzers of the type outlined in the foregoing "Description of the Prior Art" and is to be substituted for the apparatus included within the area defined by dashed lines 37 in FIG. 1. Tone value signals, the nature of which was discussed above, are applied to the preferred circuit at an input point 100 which is connected to the base of a high gain transistor 102. The output of the preferred circuit is produced at the collector of transistor 102 and this output which is in the form of a train of modified tone value signals is transmitted by a collector connection 104 to the display apparatus 38 for use thereby in producing a visual image.

A further connection links the collector of transistor 102 to a voltage source $V_2$ through a fixed resistor 108. Because the transistor 102 is chosen to have a high gain, the currents flowing in the collector and the emitter are essentially equal and the absolute value of the voltage gain from the input point 100 to the output connection 104 is, to a close approximation, proportional to the ratio of the collector load impedance to the emitter load impedance. The collector load impedance is the parallel combination of the display input impedance, a high fixed value, and the fixed resistor 108 and hence does not vary.

Since the gain of the transistor 102 is related to the ratio of collector circuit load impendace to emitter circuit load impedance and since the collector load impedance is fixed, it will be appreciated that a desired gain characteristic can be achieved by selectively controlling the load impedance in the emitter circuit. Taking advantage of this property, the preferred apparatus provides for selective switching of individualized impedances into the emitter circuit of the transistor 102 in synchronism with the individual tone value signals and more particularly in accordance with the color correspondence of those signals.

Figure 4:
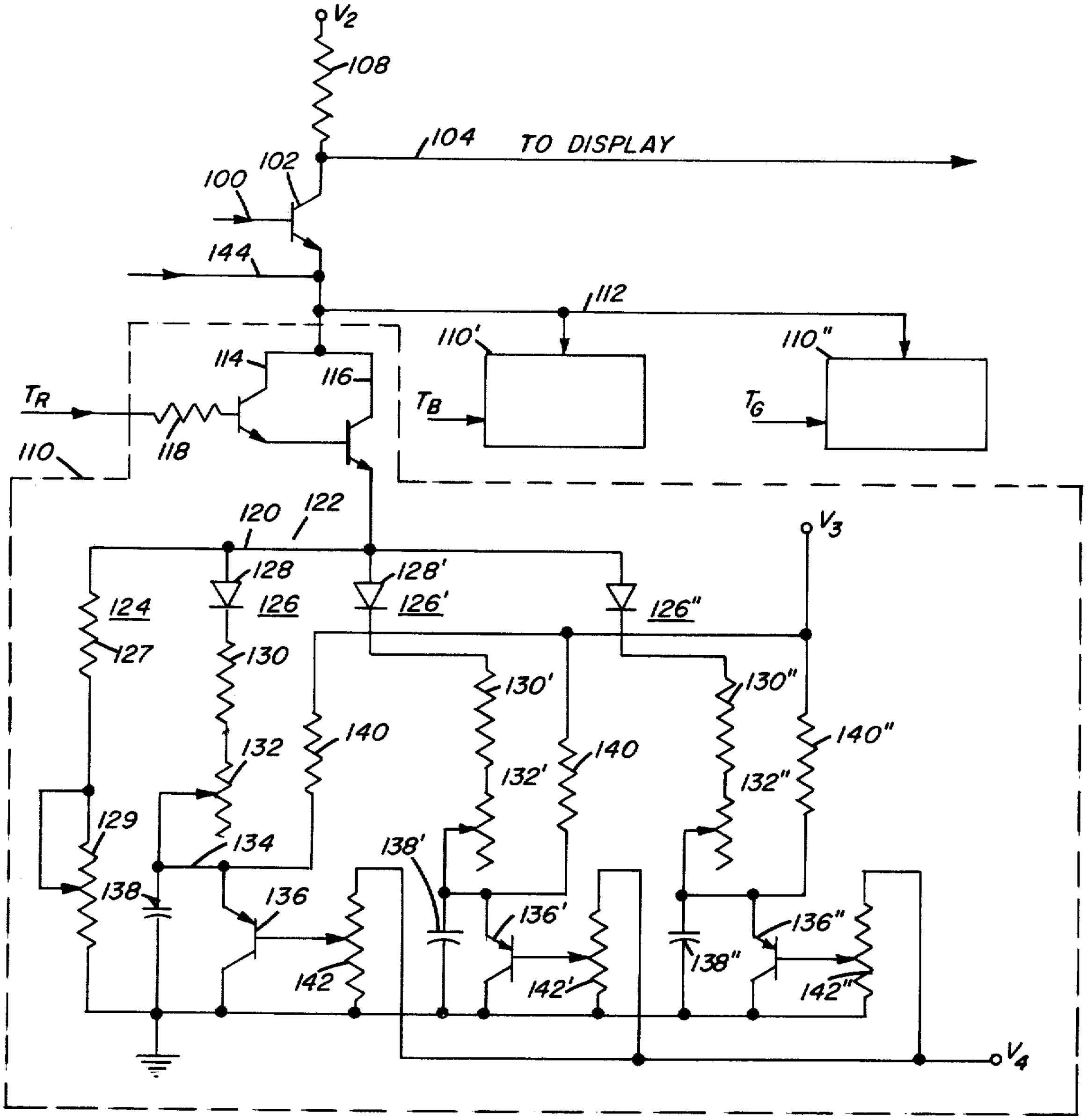
FIG. 4 is a diagrammatic representation of a circuit for use in apparatus according to the invention.

Still referring to FIG. 4, circuitry for implementing such synchronized impedance switching comprises a set of circuits 110, 110' and 110'', which are connected to the emitter of the transistor 102 at junction 112. The circuits 110, 110' and 110'' in preferred form are essentially the same and consequently only circuit 110 is illustrated and described in detail.

The input from junction 112 is transmitted to the collectors of two switching transistors 114 and 116 which act as a signal gate. A gating or timing signal input $T_R$, which will be discussed in more detail hereinafter, is applied as a gate control signal through a fixed resistor 118 to the base of transistor 114. Between the emitter of the transistor 114 and the base of the transistor 116 a connection is made to provide a Darlington switching configuration. The emitter of transistor 116 is connected at a junction 120 to a nonlinear impedance circuit 122 preferably comprising a series of parallel branches which series includes one linear impedance element 124 and a plurality of nonlinear impedance circuits 126, 126', and 126''. The linear impedance element 124 includes a fixed resistor 127 and a variable resistor 129 connected in series bewteen the junction 120 and ground.

All of the nonlinear impedance elements are, for the preferred circuit, substantially the same and therefore a detailed description will be provided only for element 126. Corresponding elements in circuits 126' and 126'' are for convenience of identification denoted by the same identifying numeral but with a prime or double primer superscript respectively.

Included in element 126 is a diode 128 connected to junction 120 and arranged to conduct current away therefrom. The diode 128 is connected through fixed resistor 130 and a variable resistor 132 in series therewith to a junction 134. The emitter of a switching transistor 136 is also connected to the junction 134, with the collector thereof being connected to ground. A capacitor 138 is connected between the emitter to the collector of switching transistor 136. Emitter-to-collector biasing for switching the transistor 136 is provided by a connection from junction 134 through a fixed resistor 140 to a voltage source $V_3$. Emitter-to-base biasing is provided by a connection potentiometer 142 which is in turn connected to a voltage source $V_4$.

Operation of the circuit 122 is best understood by considering the response characteristics of the individual parallel branches thereof when the gating transistor 116 is conducting so as to provide a voltage at the junction 120. Linear impedance element 124 provides a resistive path to ground which, by virtue of the variable resistor 132, has a preselectable impedance value. The nonlinear elements, here considered in terms of element 126, are not conducting for all input voltages, but rather conduct only in the forward direction for the diode 128, and then only above a voltage level, termed the break point, at which the switching transistor 136 begins conducting. The break point is adjustable by means of the potentiometer 142 which controls the base-to-collector biasing of the transistor 136. Capacitor 138 serves to smooth the voltage at the junction 134 in order to prevent the switching transistor 136 from oscillating between conducting and non-conducting states at voltage levels near the break point. This smoothing is necessary as switching of the transistor 136 affects to some degree the voltage level at the junction 134 and thus the operating point of the transistor itself.

With the switching transistor 136 conducting, a series path is provided from junction 120 to ground which path includes diode 128, resistor 130, variable resistor 132 and the emitter-collector circuit of the transistor. The impedance of this series path is essentially the combined resistance of the resistor 130 and the variable resistor 132, negligible impedance being contributed by the diode 128 when forward biased and the switching transistor 136 when in the conducting state.

From the foregoing it should be apparent that by adjusting the potentiometer 142 and the variable resistor 132, the break point and the path impedance respectively for the nonlinear element 126 can be preselected. Similarly, such adjustments can be made for the other nonlinear elements 126' and 126''.

The parallel branches of the circuit 122 as illustrated have a combined effect of providing a load impedance which decreases stepwise with increasing applied voltage. Step increment and bread point voltage level are selected by adjusting the individual nonlinear elements such as element 126. The impedance characteristic selected is reflected in the gain of the preferred apparatus and desired individual transfer relationships for the primary colors can be achieved by adjustment of the impedance characteristics of circuits 110, 110' and 110''.

The circuit 110 as described will produce an amplifier gain characteristic having a negative slope increasing in absolute magnitude with each impedance decrease. Gain characteristics of this type are typically required to represent the response of film systems which start with a transparency negative as an original and result in a positive print as a copy. Where other types of amplifier characteristics are required, additional cascaded amplifier stages may be used, as for example to provide for signal inversion; or various types of nonlinear circuit elements known in the art may be substituted for those described to provide additional flexibility in producing a requisite nonlinear impedance in the emitter load circuit. Furthermore, it is contemplated that the number of nonlinear elements may be varied as necessary to achieve a desired level of accuracy in the simulation. In adapting the preferred apparatus to meet specific requirements an important feature to be preserved lies in so synchronizing modification to the transfer relationship of the correction apparatus that correction to the tone value signals is individualized by color.

As an additional provision of the preferred amplifier circuit an input connection 144 to the junction 112 receives a white temperature control signal wich is in the form of a DC current and increments the current flow in the emitter load circuit of transistor 102. This current increment increases voltage drop through the emitter load circuit impedance and resultantly increases the voltage levels at the output connection 104 for purposes of compensating for aging of the display tube. Such white level control is well known and is described in U.S. Pat. No. 3,441,663 to Dreyfoos et al.

Considering the gating or timing signals in more detail, it is necessary, in order to effect the desired impedance individualization, that such signals coincide with the tone value signals for the respective primary colors. In so doing the timing signals must be in synchronism with the insertion of primary color filters by drums 28 and 40. One source for such synchronized signals in a typical analyzer is the set of channels which supply timing signals ($T_R$, $T_B$, $T_G$ in FIG. 1) to a parameter selection apparatus. Such signals are typically produced using a timing wheel as was discussed hereinabove.

Referring to FIG. 5*a*, a timing disk 146 is illustrated which would be suitable, operating in conjunction with an arrangement such as the synchronizing apparatus described hereinabove, to provide a means for production of the timing signals $T_R$, $T_B$ and $T_G$ or an analyzer having nine filters per filter drum, arranged in a repeating red-blue-green sequence. A series of perforations 148 in the disk 146 are arranged in three tracks each designated to correspond to a primary color. Curves 148, 150 and 152 of FIG. 5*b* are waveforms for signals $T_R$, $T_B$ and $T_G$ as they would appear when utilizing the timing disk 146. It will be appreciated that numerous alternative means are available for producing the necessary timing signals, the essential characteristic being that the signals produced indicate the color represented by the instant tone value signal.

During operation of the preferred apparatus, the train of tone value signals after such preliminary modification as amplification by video amplifier 32 (see FIG. 1) is received at the base of transistor 102 and is modified according to nonlinear gain relationship established by the load impedance connected in the emitter circuit of that transistor as discussed hereinbefore. The emitter load impedance includes the three circuits 110, 110' and 110'', which are controlled by the signals $T_R$, $T_B$ and $T_G$ respectively. If, for example, a tone value signal representing red tone values arrives at transistor 102 and the signal $T_R$ would be at a level to cause the transistor 114 and coupled transistor 116 to conduct so that the impedance circuit 122 is included in the emitter load circuit.

Similarly, if a tone value signal representing blue tone values arrives at the transistor 114, the signal $T_B$ would not cause the signal gate including transistor 114 and 116 to conduct but rather the corresponding signal gate in the impedance circuit 110' would conduct and the impedance of that circuit would determine the transfer relationship followed in correcting the blue tone values. After the tone value signals have been operated upon by the preferred apparatus for tone correction they are transmitted by connection 104 to the display apparatus where a simulated copy image is produced based thereon.

Referring to FIG. 6, an alternative embodiment is now described to aid in demonstrating the possibilities for application of the present invention. Means for generating a timing signal is provided in the form of a series of cam disks 200 rotating with the shaft of shaft-timing belt combination 48 (see FIG. 1). Each of a series of switches 202 is associated with a primary color, to be referred to as the identity color, and timing projections provided on cam disks 200 actuate the individual switches to a closed position in synchronism with the production of tone value signals representing this identity color.

Input signals are provided to switches 202 by individually associated nonlinear amplifiers 206 each of which operates upon the train of tone value signals produced within the analyzer. The outputs of switches 204 are connected to a single channel 208 which is in turn connected to the display apparatus. Because of the synchronized switch actuation, each of the switches selectively sends to channel 208 only signals representing the identity color. Accordingly, each amplifier 206 contributes signals for only one primary color to the apparatus output at channel 208. Hence, by proper selection of the gain characteristics for amplifiers 206 a desired tone correction individualized by color may be achieved.

The invention has been described in detail with particular reference to preferred embodiments thereof, but it will be understood that variations and modifications can be effected within the spirit and scope of the invention. For example, as previously mentioned, it is within the contemplation of the invention that various forms of impedance elements may be controllably introduced into the emitter load circuit of transistor 102 in the preferred apparatus to achieve desired gain characteristics. Furthermore, various forms of signal modifying apparatus having selectively variable signal transfer characteristics may be used in accordance with one aspect of the invention by so synchronizing changes in the signal transfer characteristics that it is possible to provide tone correction which is individualized by color. It should also be noted that mechanical as well as electrical signals are contemplated for use in synchronizing the correction of the tone value signals in apparatus according to the invention.

What is claimed is:

1. A color analyzer adapted to receive a photographic original comprising:

apparatus for scanning such a photographic original received by the analyzer to produce a series of signals bearing information of tone values for a repeating sequence of colors;

means cooperating with said scanning means for producing synchronizing signals in timed relationship to production of said tone signals;

signal processing means for receiving and operating upon the tone value signals produced by the scanning apparatus, said signal processing means including tone correction apparatus, responsive to said synchronizing signals, which modifies the tone value signals according to individualized nonlinear relationships as a function of corresponding color; and display apparatus for receiving the tone value signals which have been operated upon by the signal processing means and for producing a visual display based thereon.

2. An analyzer according to claim 1 wherein said tone correction apparatus includes nonlinear circuit means for causing a modification of the tone value signals which means is controllable to assume any one from a preselected series of individualized transfer relationships, and means, responsive to said synchronizing signals, for controlling the modification relationship assumed by said nonlinear means in synchronism with the occurrence of said tone value signals.

3. In a color analyzer having an apparatus for scanning a photographic original to produce sets of signals related to tone values for a repeating sequence of colors and having a display apparatus for producing an image based upon tone value information in the form of signals, said analyzer including means for indicating the occurrence of individual signals from the color sequence, a tone correction apparatus for use in preparing the tone-related signals for display comprising:

controllable correction means for receiving the tone-related signals and for selectively causing modifications thereof according to a series of individualized nonlinear relationships; and means responsive to such an indicating means for controlling the selection of the modification relationship for said corrective means to occur in synchronism with the the tone-related signals and as a function of color.

4. A tone correction apparatus according to claim 3 wherein said corrective means is a nonlinear amplifier of a type having a selectively controllable gain characteristic.

5. A tone correction apparatus according to claim 4 wherein said nonlinear amplifier has a gain characteristic which is related to the relationship of the impedances in two circuits which form a part thereof and wherein different impedances may be selectively gated into at least one of said circuits by said control means.

6. A tone correction apparatus according to claim 5 wherein at least one of the individual impedances are nonlinear.

7. For use in a color analyzer of the type which produces a series of signals representing tone values for a repeating sequence of colors, a tone correction apparatus comprising:

means for producing one or more timing signals occurring in synchronism with the tone-representative signals; and nonlinear means, responsive to said timing signals, for receiving and correcting the tone-representative signals, said nonlinear means having a controllably variable, nonlinear characteristic which is changed under control of said timing signals to modify the tone representative signals individually as a function of color.

8. An apparatus according to claim 7 wherein said nonlinear means is a nonlinear amplifier having a gain characteristic which is selectively adjustable in response to the timing signals.

9. An apparatus according to claim 8 wherein said nonlinear amplifier has a gain characteristic which is related to the impedance relationship between two circuits which are a part thereof and wherein said apparatus includes means for selectively introducing impedances into at least one of said circuits responsive to said timing signals to adjust the gain characteristic.

10. An apparatus according to claim 9 wherein the selectively introduced impedances are nonlinear and wherein said means for introducing impedance includes gating means cooperative with and controlled by the timing signals.

11. For use in a color analyzer of the type having a rotatable timing shaft or the like and apparatus which produces a series of tone value signals that occur in fixed phase relationships to rotation of the timing shaft or the like and represent a repeating sequence of colors, a tone correction apparatus comprising:

at least one disk adapted to rotate in relation to rotation of such timing shaft or the like, said disk having formed therein arcuate perforations which are arranged respective of the phase relationships of the tone value signals;

means cooperative with said disk for detecting the perforations therein and for resultantly producing one or more timing signals occuring in synchronism with the tone value signals; and nonlinear circuit means for receiving and correcting the tone value signals, said nonlinear means having a controllably variable, nonlinear transfer characteristic which is changed under control of said timing signals to modify the tone value signals individually as functions of color.

* * * * *